May 7, 1957  S. E. RYDING  2,791,192
PLANTING MACHINE
Filed Feb. 5, 1954  3 Sheets-Sheet 1

INVENTOR
STEPHEN E. RYDING
BY Robb&Robb
ATTORNEYS

May 7, 1957  S. E. RYDING  2,791,192
PLANTING MACHINE
Filed Feb. 5, 1954  3 Sheets-Sheet 2

INVENTOR
STEPHEN E. RYDING
BY Robb & Robb
ATTORNEYS

May 7, 1957 S. E. RYDING 2,791,192
PLANTING MACHINE
Filed Feb. 5, 1954 3 Sheets-Sheet 3

INVENTOR
STEPHEN E. RYDING
BY Robb & Robb
ATTORNEYS

United States Patent Office 2,791,192
Patented May 7, 1957

2,791,192

PLANTING MACHINE

Stephen Everard Ryding, Lancaster, England, assignor to The Tractor Shafts Company Limited, Smallford, St. Albans, England, a British company Application February 5, 1954, Serial No. 408,540

2 Claims. (Cl. 111—3)

This invention relates to planting machines and has particular application to the planting of Brassica but it is also applicable to the planting of lettuces, celery and other plants generally.

The object of the invention is to provide a machine of the above mentioned character which effects the planting in a rapid and satisfactory manner, but which also incorporates means whereby the plants are spaced mechanically at uniform and predetermined distances apart.

According to the present invention there is provided a planting machine adapted to be driven or drawn by motive means comprising a planting member which is adapted to be rotated when the machine is in motion and which is adapted to receive plants and convey them to a position where they are released, one at a time, for planting, means for forming a trench to receive the plants during the travel of the machine, and means to press the soil into the trench and about a plant after it has been deposited in the trench.

In order that the invention may be more fully understood and readily carried into effect, reference is now directed to the accompanying drawings in which:

Figure 4 is an enlarged perspective detail of one of the pockets; and

Figure 1:
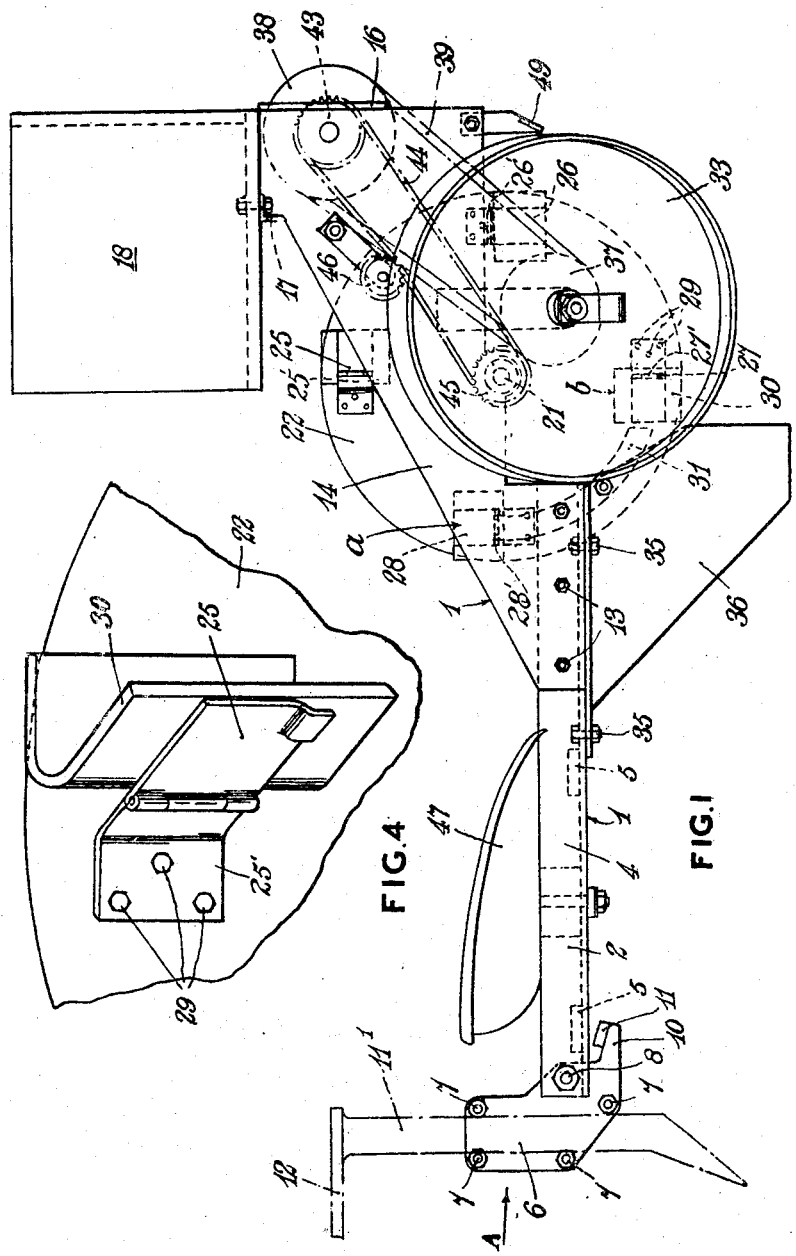
Figure 1 is a side elevation of a machine in accordance with the present invention.

The frame 1 of the machine comprises a draw-bar 2 built up from angle irons 3, 4, spaced from each other by members 5, welded to the angle irons. At one end of the draw-bar is a pair of plates 6, spaced apart by bolts 7, and pivotally connected to the angle irons, by a bolt 8, the plates being maintained in a central position with regard to the angle irons by sleeves 9. At the lower end of each plate 6 is a lug 10 and to these lugs is welded a cross piece 11 which is adapted to engage the adjacent angle irons and limit the pivotal movement of the plates 6. These plates constitute a bracket which receives a tine 11' carried by the draw-bar 12 of a tractor, not shown. Attached to the other end of the draw-bar by bolts 13 are two spaced plates 14, 15, to which is welded an end plate 16. Also welded to the plates 14, 15 is an angle iron 17 to which is bolted a box-like receptacle 18 open at its top and front. This receptacle serves for storing the plants to be planted. Welded to the plates 14, 15 are bosses 19, 20 respectively, which serve as bearings for a shaft 21. Mounted on the shaft 21 is a planting disc 22, which is rigidly anchored to the shaft 21 by a flanged member 23 secured to the shaft by a pin 24. Close to the perimeter of the disc 22 are four hinged flaps 25, 26, 27 and 28 hingedly secured to lugs 25', 26', 27' and 28' respectively removably attached to disc 22 by bolts 29, the hinges being spaced from the disc 22 as indicated in Figure 4. Secured in any suitable manner to each flap and to the adjacent surface of the disc is a lining 30 formed from a soft resilient material such as sponge rubber, the arrangement being shown more particularly in Figure 4. These flaps with their rubber linings constitute pockets to receive the plants without injury thereto. Rigidly secured to the chassis frame in any suitable manner and disposed in the path of travel of the pockets is a cam 31. When a flap engages the cam, the pocket formed by the flap closes until the plant is held by the soft rubber. Since the hinges are spaced from the disc 22, the resilient lining of each pocket will close onto a plant and hold it without forming an acute angle adjacent the hinge. Thus, a plant held in a pocket close to the hinge will not be crushed. This action will be referred to in more detail when the operation of the machine is described.

Figure 2:
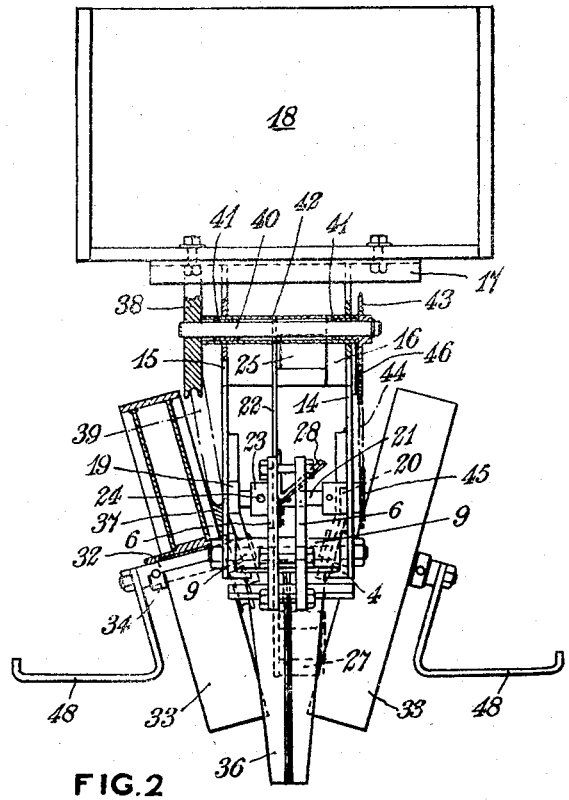
Figure 2 is an end elevation, partly in section, in the direction of the arrow "A"

Welded to the plates 14 and 15 are stub axles 32. These stub axles each mount a ground wheel 33. The plane of each wheel 33 is inclined to the vertical, as indicated in Figure 2, and the purpose of this inclination will later be made clear. Each wheel is retained on its axle by a collar 34 pinned to the axle.

Figure 3:
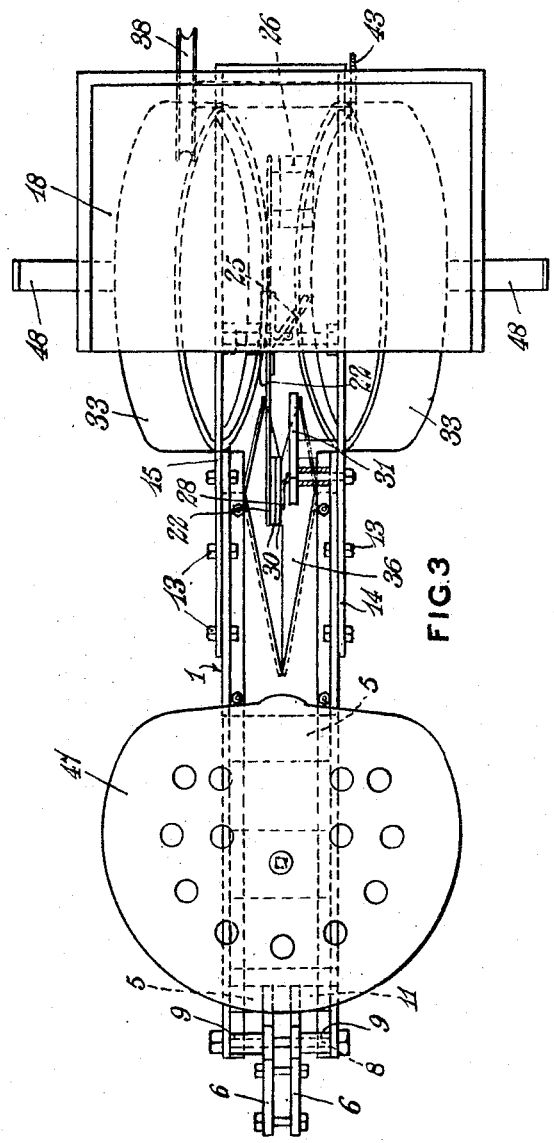
Figure 3 is a plan.

Secured to the underside of the draw-bar 2 by bolts 35 is a trench forming element 36 shaped as shown in Figures 1, 2 and 3. Referring to Figure 2, it will be seen that the ground wheels are arranged so as to slightly overlap the mouth of the trench as it is formed and, since the peripheral surface of each wheel is inclined to the horizontal, the piled up earth on each side of the trench will be pressed into the trench and will surround and firmly secure the roots of a plant placed in the trench during the travel of the machine.

Rotatable with one of the ground wheels is a pulley 37, Figure 2, which drives a pulley 38 through the medium of a round belt 39. Alternatively, a V belt drive may be provided with a suitable jockey pulley to compensate for the disalignment of the pulleys 37 and 38. These pulleys may have the same diameter. The pulley 38 is secured to a counter-shaft 40 rotatable in bearings 41 fixed in a tube 42 which is welded to the plates 14, 15. Removably attached to the shaft 40 is a sprocket wheel 43 which drives, through the medium of a chain 44, a sprocket wheel 45 fixed to the shaft 21 on which the disc 22 is mounted. Thus it will be seen that when the machine is drawn forward that the disc with its pockets will be revolved at a speed which is determined by the ratio of the sprocket wheels 43, 45. Since the sprocket wheel 43 is removable it can be replaced by another wheel having a different number of teeth. It is therefore possible to vary the speed of the disc 22 as desired. In order to provide for the lengthening or shortening of the chain drive due to different sizes of sprocket wheels, the chain is arranged to engage an adjustable jockey wheel 46 mounted on plate 14.

In use, an operator sits on a seat 47 fixed to the draw-bar 1 and rests his feet on rests 48. As each pocket arrives at position a, a plant is taken from the receptacle by the operator and is placed in the pocket. As each pocket travels downwardly it engages the cam 31 which compresses the pocket against the action of the rubber lining 30, the compression being such that the plant is held without damage thereto. When the pocket reaches the discharge position, indicated at b, Figure 1, it no longer engages the cam, consequently, the pocket opens, due to the resilience of the lining, and the plant is released so that the roots thereof are placed in the trench where they are gripped by the soil flowing back into the trench behind the trenching element 36. As soon as the plant is in position, the following ground wheels press the soil into the trench and about the roots of the plant. It will be obvious that the spacing of the plants will be in accordance with the number of pockets provided and also the speed of the disc relatively to that of the ground wheels.

Thus it is possible to obtain a considerable variation in the spacing according to requirements.

Figure 5:
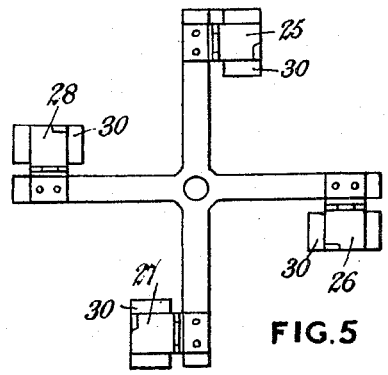
Figure 5 is an elevation of a modified member for mounting the pockets.

The pockets need not necessarily be mounted on a disc but may be carried at the ends of arms as illustrated in Figure 5. In order to remove soil adhering to the treads of the ground wheels, a scraper indicated at 49 is provided.

What I claim is:

1. A planting machine comprising a frame, spaced plates connected to one end of the frame, a receptacle for plants secured to the upper part of the spaced plates, a trench forming element carried by the frame, inclined ground wheels disposed behind and slightly overlapping the trench forming element to support the machine and to press earth displaced by the element back into the trench, a transverse shaft carried by the spaced plates, a planting member rigidly anchored to said shaft a plurality of removably mounted spaced hinged flaps close to the perimeter of the planting member and having their hinges spaced from said planting member, a soft resilient lining for each flap secured to the member and to the flap so that these flaps with their resilient linings constitute pockets to receive and to hold plants without injury thereto, an arcuate cam secured to the frame in the path of travel of the flaps so that it engages each flap in turn as the planting member is rotated to partially close the pocket without forming an acute angle therein, whereby a plant may be held in the pocket without damage and may be released when the flap passes the cam for planting in the trench formed by the element, means to drive the planting member from one of the ground wheels and means to vary the speed of rotation of the member relatively to the ground wheels, to correspondingly vary the intervals at which the plants will be released and thereby the spacing of said plants.

2. A planting machine comprising a frame, spaced plates connected to one end of the frame, a receptacle for plants secured to the upper part of the spaced plates, a trench forming element carried by the frame, inclined ground wheels disposed behind and slightly overlapping the trench forming element to support the machine and to press earth displaced by the element back into the trench, a transverse shaft carried by the spaced plates, a planting member rigidly anchored to said shaft, a plurality of removably mounted spaced hinged flaps close to the perimeter of the planting member, and having their hinges spaced from said planting member, a soft resilient lining for each flap secured to the member and to the flap so that these flaps with their resilient linings constitute pockets to receive and to hold plants without injury thereto, an arcuate cam secured to the frame in the path of travel of the flaps so that it engages each flap in turn as the planting member is rotated to partially close the pocket without forming an acute angle therein whereby a plant may be held in the pocket without damage and may be released when the flap passes the cam for planting in the trench formed by the element, a first pulley rotatable with one of the ground wheels, a counter shaft rotatable in bearings carried by the spaced plates, a second pulley mounted on the counter shaft, a belt to connect the first pulley to the second pulley, a first sprocket wheel removably mounted on the counter shaft, a second sprocket wheel mounted on the transverse shaft and a chain drive to connect the first sprocket wheel to the second sprocket wheel whereby the spacing of the plants may be changed by changing the removably mounted sprocket wheel to alter the speed of revolution of the planting member relatively to that of the ground wheels.

References Cited in the file of this patent

UNITED STATES PATENTS

| | | |
|---|---|---|
| 1,765,468 | Vollink | June 24, 1930 |
| 1,888,143 | Poll | Nov. 15, 1932 |
| 1,924,133 | Schutmaat | Aug. 29, 1933 |

FOREIGN PATENTS

| | | |
|---|---|---|
| 644,460 | France | June 5, 1928 |